United States Patent [19]

Auernhammer

[11] 4,197,764
[45] Apr. 15, 1980

[54] DETACHABLE HANDLE ASSEMBLY

[76] Inventor: Marcus J. Auernhammer, 11295 Engleside, Detroit, Mich. 48205

[21] Appl. No.: 964,964

[22] Filed: Nov. 30, 1978

Related U.S. Application Data

[63] Continuation of Ser. No. 786,656, Apr. 11, 1977, abandoned.

[51] Int. Cl.² .................... G05G 1/00; B25G 3/00
[52] U.S. Cl. ........................... 74/544; 30/340; 403/390
[58] Field of Search ............ 74/480 B, 544, 551.1; 30/340, 341, 342, 344; 24/81 CR; 403/390, 399, 400

[56] References Cited

U.S. PATENT DOCUMENTS

| 1,262,425 | 4/1918 | Young | 74/544 |
|---|---|---|---|
| 1,450,113 | 3/1923 | Pratt | 74/544 |
| 2,602,953 | 7/1952 | Dalglish et al. | 74/551.1 |
| 2,697,457 | 12/1954 | Lawrence | 30/340 |
| 2,716,281 | 8/1955 | Wallace | 30/344 |
| 3,274,849 | 9/1966 | Hanson | 74/544 |
| 3,371,641 | 3/1968 | Rohman et al. | 74/480 B |
| 3,456,525 | 7/1969 | Oldham | 74/480 B |
| 3,503,276 | 3/1970 | Vigot | 74/544 |
| 3,949,817 | 4/1976 | Rice | 74/544 |
| 4,032,246 | 6/1977 | Waara | 403/390 |

FOREIGN PATENT DOCUMENTS 918043 1/1947 France ............................ 74/544

Primary Examiner—Kenneth Dorner
Attorney, Agent, or Firm—Gifford, Chandler, VanOphem, Sheridan & Sprinkle

[57] ABSTRACT

A detachable handle assembly is provided for a powered garden tool, such as a hedge trimmer. The handle assembly according to the present invention includes an elongated first member having a hand grip formed at one axial end. A clamp assembly is connected to the other axial end of the elongated member and detachably, clampingly receives the garden tool so that the garden tool can be moved by means of the elongated handle member. In addition, the clamp assembly is adjustably coupled to both the garden tool and the elongated handle member such that both the angle and pitch of the garden tool relative to the elongated handle member can be infinitely variably adjusted.

4 Claims, 4 Drawing Figures

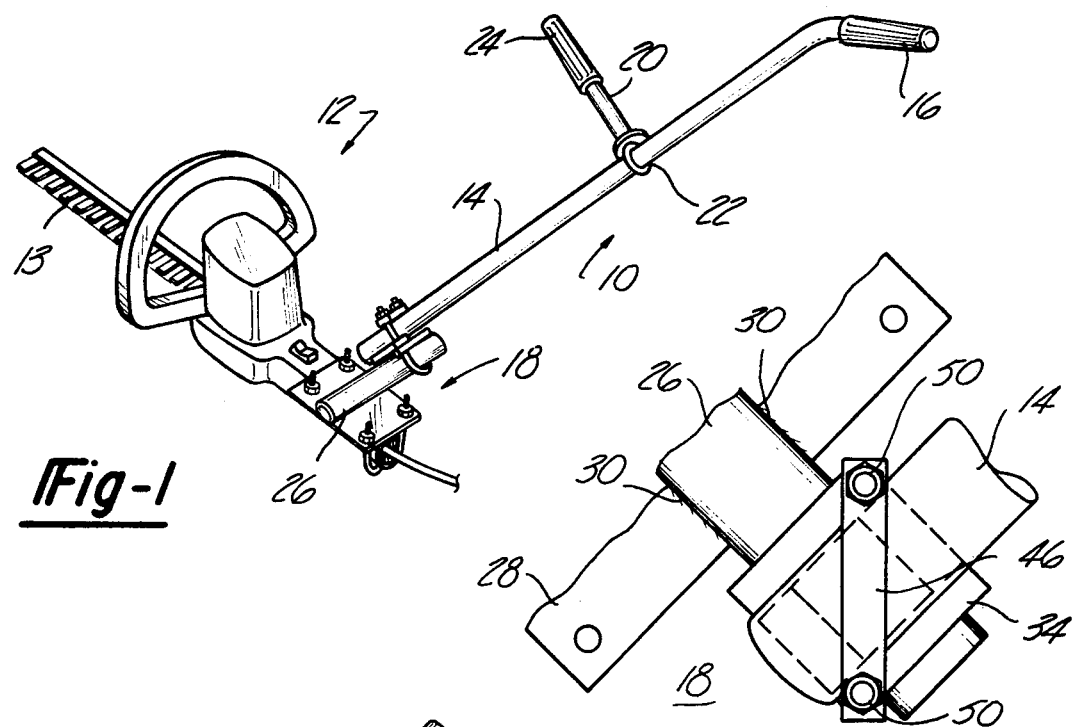
Fig-1
Fig-3
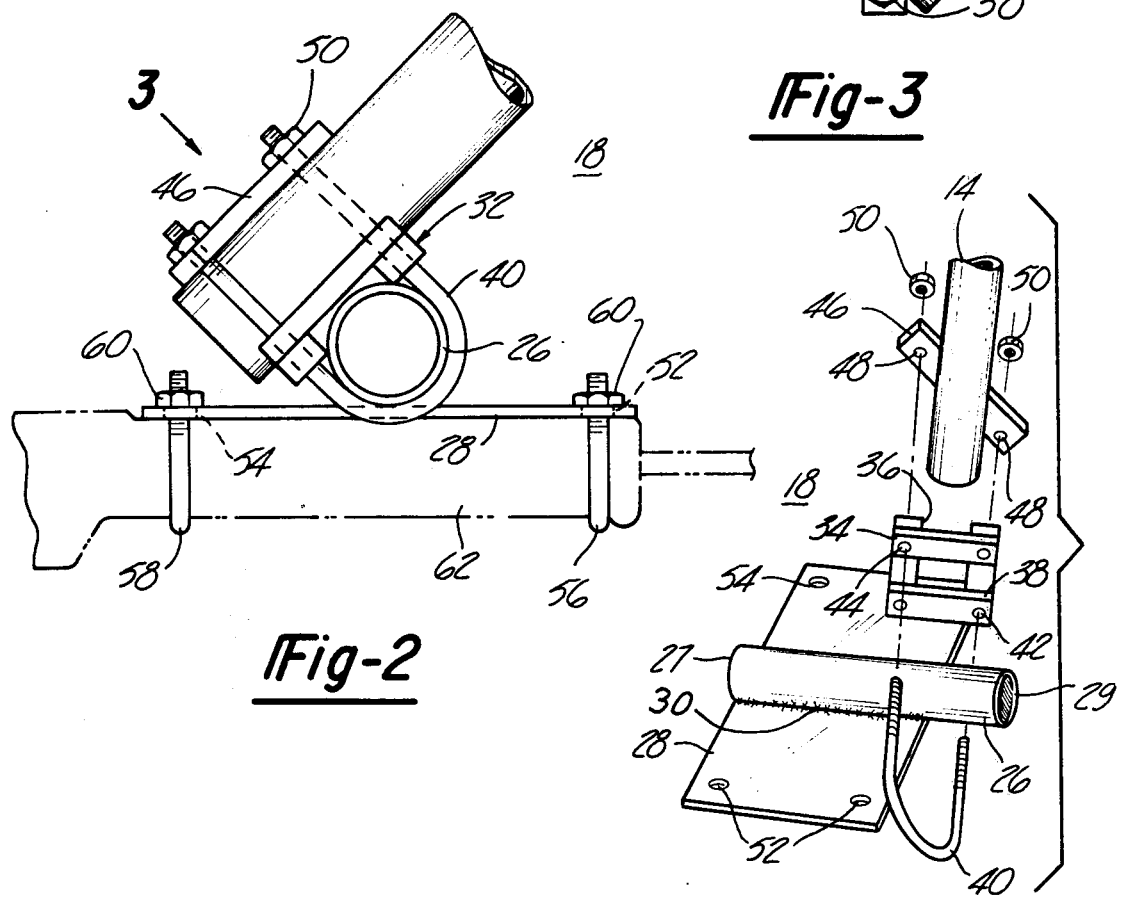
Fig-2
Fig-4

DETACHABLE HANDLE ASSEMBLY

CROSS REFERENCE TO RELATED APPLICATIONS

This is a continuation of application Ser. No. 786,656, filed Apr. 11, 1977 and now abandoned.

BACKGROUND OF THE INVENTION

I. Field of the Invention

The present invention relates generally to detachable handles and, more particularly, to such a handle especially suited for detachable connection with a powered garden tool.

II. Description of the Prior Art

A plurality of different powered lawn and garden tools are now commercially available. Such lawn and garden tools typically are electrically powered and in addition are particularly suited for home use.

These power tools, however, suffer the disadvantage that they are relatively expensive to purchase and yet are limited to a single, or at most a few uses. For example, an electric hedge trimmer conventionally includes a short protruding handle portion which is gripped by the hand of the user and manually moved to perform the desired cutting operation with the trimmer cutting blades. An electric hedge trimmer is typically used for trimming hedges, trees, bushes, and the like.

An electric hedge trimmer, however, can also be effectively used to cut weeds, high grass, and the like. However, to do so, requires the user to squat down on his hands and knees in order to reach the weeds or high grass with the hedge trimmer. Due to the awkwardness of this position, however, most users do not use the electric hedge trimmer to cut weeds and grass but rather purchase a separate electric weed cutter with an elongated handle so that the user can stand while operating the powered weed cutter. This solution, however, is disadvantageous in that it requires the user to purchase two relatively expensive and different tools while a single tool, namely the electric hedge trimmer, can adequately operate to perform both jobs.

SUMMARY OF THE PRESENT INVENTION

The present invention overcomes the above-mentioned disadvantages by providing a detachable handle assembly particularly suited for attachment to a powered garden tool, such as an electric hedge trimmer. By this provision, the garden tool can be used for multiple purposes thus increasing the overall utility of the powered garden tool.

In brief, the detachable handle assembly of the present invention comprises an elongated member having a hand grip formed at one axial end. A clamp assembly is attached to the other axial end of the elongated member and includes means for detachable connection with the handle of a powered garden tool, such as a hedge trimmer. As will be more fully understood as the description proceeds, the clamp assembly is infinitely variably adjustable so that both the angle and pitch of the powered garden tool can be adjusted relative to the elongated member.

With the detachable handle assembly of the present invention detached from the garden tool, the garden tool can be manually manipulated in its normal and intended fashion. Conversely, with the handle assembly of the present invention attached to the garden tool, the garden tool can be used in other applications without undue awkwardness imposed upon the user during use.

BRIEF DESCRIPTION OF THE DRAWINGS

The detachable handle assembly of the present invention will be better understood upon reference to the following detailed description when read in conjunction with the accompanying drawings, wherein like reference characters refer to like parts throughout the several views, and in which:

FIG. 1 is a perspective view illustrating the detachable handle assembly of the present invention attached to a garden tool;

FIG. 2 is a fragmentary side plan view showing one portion of the handle assembly of the present invention and enlarged for clarity;

FIG. 3 is a fragmentary plan view illustrating one portion of the handle assembly of the present invention as viewed along arrow 3 in FIG. 2; and FIG. 4 is a fragmentary, exploded view illustrating one portion of the handle assembly of the present invention.

DETAILED DESCRIPTION OF THE PRESENT INVENTION

With reference first to FIG. 1, a detachable handle assembly 10 according to the present invention is thereshown secured to a powered garden tool 12 having cutting blades 13, such as an electric hedge trimmer. The handle assembly 10 comprises an elongated member 14 having a hand grip 16 secured to one end and a clamp assembly 18 secured to its other end for detachable connection with the garden tool 12 as will be subsequently described in greater detail. The elongated member 14 is preferably tubular in cross-section and may be constructed from any suitable material, such as aluminum, steel, plastic, or the like.

A stabilizer arm 20 is secured to the elongated member 14 slightly above the midpoint of the member 14 so that the stabilizer arm 20 extends substantially perpendicularly outwardly from the member 14. The stabilizer arm 20 can be secured by any appropriate means, such as welds 22, and includes a hand grip 24 at its free end which is substantially identical to the hand grip 16. By means of the hand grips 16 and 24, a user (not shown) can easily hold and manipulate the handle assembly 10 with the attached garden tool 12 to the desired position. In addition, the stabilizer arm 20 is preferably constructed of the same material as the member 14 and like the member 14 is tubular in construction for lightness.

The clamp assembly 18 for securing the garden tool 12 onto the lower end of the member 14 is shown in greater detail in FIGS. 2-4. The clamp assembly 18 includes a cylindrical and tubular connecting arm 26 having a rectangular plate 28 secured along one side of the member 26 by welds 30 or other appropriate means. The plate 28 is substantially flush with one axial end 27 of the connecting arm 26 and extends approximately one-half the axial length of the arm 26. In addition, the arm 26 preferably bisects the plate 28.

The other axial end 29 of the connecting arm 26 is secured by a clamp 32 to the lower axial end of the elongated member 14 so that the longitudinal axis of the connecting arm 26 is substantially perpendicular to the axis of the member 14. While the clamp 32 may be of any conventional design of the type for connecting criss-crossing tubular members together, preferably it is of the type disclosed in U.S. patent application Ser. No.

684,872, entitled Clamp and filed on May 10, 1976, and which is commonly owned with the present invention. Reference should, therefore, be had to that disclosure for a complete description of the clamp 32.

However, in the interest of clarity, the clamp 32 includes a central spacer 34 with a rectangular channel 36 formed on one side and a second rectangular channel 38 formed on its other side so that the channels 36 and 38 are substantially perpendicular to each other. The spacer 34 is then positioned between the elongated member 14 and connecting arm 26 so that the member 14 is positioned within the channel 36 while the arm 26 is positioned within the channel 38. Thereafter the free ends of a U-bolt 40 are disposed through diagonally opposed apertures 42 and 44 formed through the spacer 34 so that the arm 26 is positioned between the U-bolt 40 and the spacer 34.

The free ends of the U-bolt 40 are then positioned through apertures 48 formed through a crossbar 46 so that the lower end of the member 14 is disposed between the crossbar 46 and the spacer 34. Nuts 50 threadably engage the free ends of the U-bolt 40 so that, upon tightening, the member 14 and arm 26 are simultaneously clamped to the spacer 34. It will, of course, be appreciated that both the connecting arm 26 and the member 14 can be rotated relative to the spacer 34 to the desired angular position prior to the tightening of the nuts 50.

With reference now particularly to FIGS. 2 and 4, a first pair of spaced apertures 52 are formed through the plate 28 on one side of the connecting arm 26 while a like pair of apertures 54 (only one of which is shown) are formed through the plate 28 on the other side of the connecting arm 26. The free ends of a U-bolt 56 are disposed from the bottom through the first pair of apertures 52 while the free ends of a like U-bolt 58 are similarly received through the apertures 54. Nuts 60 threadably engage the free ends of the U-bolts 56 and 58 on the upper side of the plate 28 so that the U-bolts 56 and 58 are retained to the plate 28.

The U-bolts 56 and 58 each form a U-shaped channel so that the U-shaped channels are parallel with and in registry with each other. The U-bolts 56 and 58 are then adapted to slidably receive a protruding handle portion 62 of the garden tool 12 through the U-shaped channels as shown in FIG. 2 so that upon tightening of the nuts 60, the garden tool handle portion 62 is clamped to the plate 28. Conversely, of course, by loosening the nuts 60, the handle portion 62 can be slid out from the U-bolts 56 and 58 so that the garden tool 12 can be manually manipulated in its normal and intended fashion.

It can, therefore, be seen that the detachable handle assembly 10 of the present invention provides a simple, inexpensive and yet totally effective means which, when attached to an appropriate garden tool 12, can be used to manipulate the garden tool 12 in the desired manner. Moreover, since the rotational position of the elongated member 14 relative to the clamp assembly 18 can be adjusted and then secured in position, the desired rotational position of the stabilizer arm 20 and the desired pitch of the garden tool 12 (i.e. the angle of the cutting blade 13 relative to the horizontal) relative to the elongated handle 14 can be obtained. Similarly, since the support arm 26 can be rotated within the U-bolt 40 to the desired rotational position and then clamped against further rotation by the U-bolt 40, the angle of the garden tool 12 relative to the elongated member 14 can be infinitely variably adjusted.

The detachable handle assembly 10 of the present invention has been described for use in conjunction with a hedge trimmer and, when attached, in effect forms an electrically powered scythe which has proven particularly useful and effective in use. It will be understood, however, that the detachable handle assembly 10 can be used for other types of powered garden tools having a protruding handle portion without deviating from the spirit of the invention.

Having thus described my invention, many modifications thereto will become apparent to those skilled in the art to which it pertains without deviation from the spirit of the invention as defined by the scope of the appended claims.

I claim:

1. A detachable handle assembly for a hedge trimmer, said hedge trimmer having an elongated outwardly protruding handle portion on one end, said handle assembly comprising:
   an elongated cylindrical member having hand gripping means formed at a first end;
   an elongated stabilizer arm secured at one end to said elongated cylindrical member so that said stabilizer arm extends perpendicularly outwardly from said elongated cylindrical member, said stabilizer arm having hand gripping means formed at its other axial end;
   means for detachably securing a second end of the elongated member to the handle portion of the hedge trimmer, said detachable means comprising:
   a flat plate;
   a cylindrical connecting arm secured substantially entirely across one side of the plate so that a portion of the connecting arm protrudes outwardly from one edge of the plate;
   means for detachably attaching one longitudinal side of the trimmer handle to the other side of the connecting plate so that the axis of the handle portion is substantially perpendicular to the axis of the connecting arm; and
   means for clamping a second end of the elongated cylindrical member to the outwardly protruding portion of the connecting arm, said clamping means including means for infinitely variably adjusting the angle between the axis of said elongated member and the plane of the connecting plate and for also infinitely variably adjusting the rotational position of the elongated cylindrical member to thereby adjust the rotational position of said stabilizer arm.

2. The invention as defined in claim 1 wherein said detachable attaching means comprises a pair of U-bolts, each U-bolt forming a U-shaped channel, the free ends of said U-bolt being disposed through apertures formed in said connecting plate so that said U-shaped channels are substantially parallel to and in registry with each other whereby said hedge trimmer handle portion can be slid through said U-shaped channels, and nut members which threadably engage the free ends of said U-bolts on the first mentioned side of said plate so that upon tightening, the U-bolts clamp said hedge trimmer handle portion to the other side of said plate.

3. The invention as defined in claim 1 wherein said clamping means comprises a generally rectangular spacer positioned between said connecting arm and said elongated cylindrical member, a U-bolt disposed through diagonally opposed apertures in said spacer so that said connecting arm is positioned between said U-bolt and said spacer, a bar having apertures which register with and receive the free ends of the U-bolt therethrough so that said elongated member is disposed between said bar and said spacer, and nut members which threadably engage the free ends of said U-bolt and secure the connecting arm and elongated cylindrical member together upon tightening.

4. The invention as defined in claim 1 wherein said elongated cylindrical member is tubular.

* * * * *